United States Patent [19]
Nisper et al.

[11] Patent Number: 5,538,674
[45] Date of Patent: Jul. 23, 1996

[54] METHOD FOR REPRODUCING HOLOGRAMS, KINOFORMS, DIFFRACTIVE OPTICAL ELEMENTS AND MICROSTRUCTURES

[75] Inventors: Jon Nisper; Gina Kritchevsky, both of Tucson, Ariz.

[73] Assignee: Donnelly Corporation, Holland, Mich.

[21] Appl. No.: 154,558

[22] Filed: Nov. 19, 1993

[51] Int. Cl.⁶ .................................................. B29D 11/00
[52] U.S. Cl. ..................... 264/1.31; 264/1.36; 264/2.5; 264/485; 264/162; 264/219; 264/328.1
[58] Field of Search .................................. 264/1.31, 1.32, 264/1.36, 1.37, 219, 220, 22, 106, 107, 2.5, 485, 162, 328.1; 425/174.4, 808

[56] References Cited

U.S. PATENT DOCUMENTS

| | | | |
|---|---|---|---|
| 4,219,721 | 8/1980 | Kamen et al. | 264/1.37 |
| 4,619,804 | 10/1986 | Leonard et al. | 264/220 |
| 4,707,321 | 11/1987 | Segawa et al. | |
| 4,737,447 | 4/1988 | Suzuki et al. | 430/321 |
| 4,788,015 | 11/1988 | Sakai et al. | |
| 4,793,953 | 12/1988 | Maus . | |
| 4,828,769 | 5/1989 | Maus et al. | |
| 4,832,966 | 5/1989 | Newsteder | 264/219 |
| 4,842,782 | 6/1989 | Portney et al. | 264/1.37 |
| 4,895,790 | 1/1990 | Swanson et al. | |
| 4,933,120 | 6/1990 | D'Amato et al. | |
| 4,936,665 | 6/1990 | Whitney . | |
| 5,003,915 | 4/1991 | D'Amato et al. | |
| 5,013,494 | 5/1991 | Kubo et al. | |
| 5,071,597 | 12/1991 | D'Amato et al. | |
| 5,083,850 | 1/1992 | Mallik et al. | |
| 5,085,514 | 2/1992 | Mallik et al. | |
| 5,116,548 | 5/1992 | Mallik et al. | |
| 5,153,772 | 10/1992 | Kathman et al. | |
| 5,156,943 | 10/1992 | Whitney . | |
| 5,161,059 | 11/1992 | Swanson et al. | |
| 5,189,631 | 2/1993 | Palmer et al. | |
| 5,218,471 | 6/1983 | Swanson et al. | |
| 5,227,897 | 7/1993 | Fohrman et al. | |
| 5,279,924 | 1/1994 | Sakai et al. | |
| 5,292,457 | 3/1994 | Arai et al. | |
| 5,386,319 | 1/1995 | Whitney . | |
| 5,389,313 | 2/1995 | Imataki et al. | 264/107 |

FOREIGN PATENT DOCUMENTS

| | | |
|---|---|---|
| 0355589 | 2/1990 | European Pat. Off. . |
| 0312341 | 1/1995 | European Pat. Off. . |
| 0635347 | 1/1995 | European Pat. Off. . |
| 3121490 | 4/1982 | Germany . |
| 62-30030 | 2/1987 | Japan . |
| 62-80045 | 4/1987 | Japan . |
| 62-079489 | 4/1987 | Japan . |
| 62-119100 | 5/1987 | Japan . |
| 62-101438 | 5/1987 | Japan . |
| 62-128720 | 6/1987 | Japan . |
| 62-146624 | 6/1987 | Japan . |
| 2187131 | 9/1987 | United Kingdom . |

*Primary Examiner*—Mathieu D. Vargot
*Attorney, Agent, or Firm*—Fitzpatrick, Cella, Harper & Scinto

[57] ABSTRACT

A method of molding a plastic element having a microstructure embedded therein includes the steps of providing a master having a microstructure therein; casting a liquid surface coating over said master; solidifying the liquid surface coating to form a rigid molding tool containing said microstructure; placing the molding tool into a molding machine; introducing a plastic element into the molding machine; transferring the microstructure from the molding tool to the plastic element; and removing the molded plastic element from the molding machine. The molding tool may also be produced by machining directly into a molding base element a predetermined microstructure without machining through a transfer interlayer. An injection-molded binary optical element produced according to the method of the present invention provides an injection molded optical element which diffracts light.

31 Claims, 3 Drawing Sheets

METHOD FOR REPRODUCING HOLOGRAMS, KINOFORMS, DIFFRACTIVE OPTICAL ELEMENTS AND MICROSTRUCTURES

BACKGROUND OF THE INVENTION

1. Field Of The Invention

The present invention relates to a method for reproducing holograms, kinoforms, diffractive optical elements, microstructures, and a plastic binary optical element preferably produced by such a method. In particular, the present invention relates to a method for mass producing plastic elements containing functional (holograms, microgears, etc.) and non-functional (decorative) surface irregularities or discontinuities by the process of plastic molding (injection molding, casting, etc.). The present invention also particularly pertains to a plastic molded binary optical element capable of performing optical functions which heretofore required a plurality of lenses and/or other optical structures.

2. Description Of The Related Art

Previous methods and techniques developed for casting and injection molding of plastic microstructures have proven to be either inaccurate, too expensive, or too time consuming to be used for mass production, such as U.S. Pat. No. 5,227,897 to Fohrman, et al. For example, U.S. Pat. No. 5,071,597 to D'Amato, et al., discloses a technique for forming a mold to replicate large numbers of plastic articles by injection molding. The mold contains a hologram or other microstructure to be transferred to an outside surface of the molded article. First, a model of the article to be molded (e.g., a bottle cap) is prepared having a hologram on one surface thereof. The hologram is prepared by exposing a photosensitive film to two beams of coherent light that intersect each other at the photosensitive film with a finite angle therebetween. As a result, the photosensitive film records an interference pattern between the two beams over the film's two-dimensional surface. If one of the light beams is modulated, a holographic microstructure is produced, whereas if neither beam is modulated, a simple diffraction grating is formed on the photosensitive film. The photosensitive film is then attached to the article model. After the model has been so-constructed, a thin layer of silver is electrodeposited over the hologram microstructure so that the silver faithfully follows the surface relief pattern. A nickel metal layer is then electrodeposited over the silver layer. Thereafter, the deposited nickel layer is removed from the model structure and attached to a backing plate for strength. The backing plate is then positioned in an injection molding cavity and liquid plastic is injected therein and allowed to cure or solidify to produce a plastic element having the hologram or other microstructure embedded therein.

However, it can been seen that this process is quite expensive and time consuming, requiring several electrodeposition steps to form the molding plate. Furthermore, the molding plate produced by such a method is usually quite thin and may become warped when it is inserted into the molding machine, or within the molding machine itself due to the high temperatures and pressures used in the injection molding process.

Other techniques for replicating a microstructure in a molding plate utilize methods such as vacuum deposition, chemical deposition, etc. Such techniques also result in warpage of the molding plate due to the thin nature of the insert, and require an excessive amount of time. Furthermore, the soft nature of the metals used in such techniques leads to premature wear of the molding plate, requiring additional costly and time-consuming replications of the molding plate.

U.S. Pat. No. 5,013,494 to Kubo, et al., discloses a process for preparing blazed holograms wherein the first generation hologram master itself is placed into the injection molding machine. In detail, a photoresist is coated on a glass substrate, subjected to exposure, and developed, thereby forming a predetermined photoresist pattern. Then, an ion beam etching treatment is effected on the surface of the glass substrate by using said pattern as a photomask, thereby providing an image transfer layer. The glass molding plate is inserted into the injection molding machine and an acrylic resin is injected therein to produce a plastic part having the microstructure embedded therein. Again, such a technique is costly, slow, and produces a fragile molding plate subject to breakage and/or premature wear.

In an alternative embodiment, Kubo, et al., discloses a process wherein a thin, 500–2000 Å metal layer is deposited on an etched glass layer and then backed with an electrodeposited metal layer such as Ni, Ni—Co alloys, which is 0.2–0.4 mm thick. This metal layer is then removed from the glass and inserted into the injection molding machine. There are, however, a number of disadvantages to this process. First, the photoresist and the glass substrate will etch at different rates. This will cause a change in the geometry of the pattern as it is transferred into the substrate material. For example, if the photoresist pattern has peaks that are 1 micron above the substrate surface, and valleys that are 0.1 micron above the surface of the substrate, and if it is assumed that the resist etches at twice the rate of the glass substrate, then in the time it requires to etch through to transfer the 1 micron peaks into the glass, in the valley area, 0.1 micron of the resist will have been etched through and also 0.45 micron of the glass substrate. Therefore, what was a 0.9 micron high feature will now be only 0.45 microns in height. The geometry across the grating will not change, however. Second, if any of the structure in the photoresist shadows any lower structure (in the direction of the etch), accurate replication of the surface discontinuities will be impossible. In fact, Kubo, et al., describes a slantwise irradiation which can be used to create a blazed structure, but which would be unsuitable to creating holographic microstructures. Furthermore, the Kubo metal substrate is replicated from a glass substrate and is, therefore, a generation removed in accuracy. Again, such steps are time-consuming and expensive.

While certain U.S. patents speak of "casting a hologram" (U.S. Pat. Nos. 4,933,120; 5,003,915; 5,083,850; and 5,116,548), the liquid resin is actually cast onto a flexible paper web, and a hologram master is then pressed into the resin to form the surface relief pattern. Such a technique is not applicable to the mass production of plastic elements.

Binary optics is an emerging technology wherein an optical element (e.g., a lens) includes a surface relief pattern for effecting modulation of an optical wavefront passing therethrough. Thus, not only is the light beam refracted by the lens element, but it is also diffracted by the surface relief pattern to produce an image from a single incident plane wave. A binary optical element (BOE) may be defined as a diffractive optical element having multi-levels of phase which is a stepped approximation of an ideal surface profile of a kinoform lens (see FIG. 1C). The kinoform lens, like a Fresnel lens, has a discontinuous thickness (or refractive index) profile. However, the operation of a kinoform relies on its interference of light from different zones, i.e., diffraction mechanisms (optical path difference at the discontinuities is an integral number of wavelength), while a Fresnel lens bends rays of light by the refraction mechanism (optical path difference at the discontinuities is not carefully controlled). Kinoforms are also called "micro-Fresnel lenses". The performance of the kinoform can be diffraction-limited, but that of the Fresnel lens is not diffraction-limited.

FIG. 1A is a schematic depiction of a quadratic kinoform showing a corresponding conventional lens in dashed line. A corresponding linear kinoform of slightly lower efficiency is depicted in FIG. 1B. The corresponding BOE is depicted in FIG. 1C, which may have higher or lower efficiency than the linear kinoform depending on the number of levels used. Binary optics refers to the dual-level (high-low) nature of the phase-relief pattern used to control the phase, amplitude, and polarization of an optical wavefront. FIG. 1C depicts a four-level relief structure which may be fabricated using the same technologies used to produce VLSI devices in the electronics industry.

The properties of BOE's can be exploited to carry out a variety of tasks such as dispersion compensation, thermal compensation, beam steering, optical multiplexing, light wave modulation, optical interconnecting of a variety of light signals, collimating, light wave redistributing, etc. These different functions may be achieved by varying the location and size of the array of phase gratings on the surface of the lens.

Heretofore, the production of BOE's has been costly and time consuming because such BOE's are produced by painstakingly etching the individual binary microstructure onto the surface of a polished glass lens or mirror. Alternatively, a BOE may be produced by providing a conventional glass lens with a coating of photoresist with a holographic structure individually patterned into the resist layer. See U.S. Pat. Nos. 4,895,790; 5,161,059; and 5,218,471 for such conventional techniques. However, these techniques require a great amount of labor, capital and time, as with the other techniques discussed above. However, binary optics are advantageous in that one or a small number of BOE's may replace lens systems requiring a significant number of glass elements, such as wide field of view systems.

Accordingly, what is needed is an inexpensive, accurate, and fast method for producing durable plastic elements having a microstructure embedded therein, and a plastic BOE produced by such a method.

SUMMARY OF THE INVENTION

It is an object of the present invention to provide an efficient, cost-effective method for molding a microstructure into a plastic element. This objective can be achieved by an improved technique for transferring the desired diffractive optical features or microstructure to the molding plate. In particular, according to the present invention, a liquid surface coating (e.g., ceramic or epoxy) may be applied to a master having a holographic or other microstructure thereon. After ensuring that the liquid surface coating penetrates and conforms to the surface irregularities of the microstructure, the liquid surface coating is cured or solidified to provide a strong molding plate which can be used in an injection molding machine. This technique avoids the expensive and time consuming electrodeposition and etching methods of the prior art.

Another object of the present invention is to provide an inexpensive plastic binary optical element which has been molded according to the improved molding technique discussed above.

According to one aspect of the present invention, a method of molding a plastic element having a microstructure embedded therein comprises the steps of: (a) providing a master having a microstructure thereon; (b) casting a liquid surface coating over said master; (c) curing or solidifying the liquid surface coating to form a rigid molding tool containing said microstructure; (d) placing the molding tool into a molding machine; (e) introducing a plastic element into the molding machine; (f) transferring the microstructure from the molding tool to the plastic element; and (g) removing the molded plastic element from the molding machine.

According to another aspect of the present invention, a method of molding a plastic element having a microstructure embedded therein comprises the steps of: (a) machining directly into a molding base element a predetermined microstructure without machining through a transfer interlayer; (b) placing the machined base element into a molding machine; (c) introducing a plastic element into the molding machine; (d) transferring the microstructure from the molding base element to the plastic element; and (e) removing the molded plastic element from the molding machine.

According to a further aspect of the present invention, a plastic injection-molded binary optical element comprises a plastic injection-molded optical member for interacting with incident light, said injection-molded member comprising a homogenous plastic material and having at least one face. An injection-molded binary optical microstructure is disposed on the at least one face of the injection-molded member. The injection-molded microstructure comprises the same homogenous plastic material as the injection-molded member and is integral therewith. The injection-molded binary optical microstructure diffracts light passing therethrough.

These and other advantages and features according to the present invention will be readily understood by reference to the following detailed description of the preferred embodiments taken in conjunction with the accompanying drawings.

DETAILED DESCRIPTION OF THE PREFERRED EMBODIMENTS

INTRODUCTION

Two techniques will be discussed below for efficiently producing a molding plate for use in injection molding or casting according to the present invention. One example of the first technique and two examples of the second technique will be described below. Also discussed below is an all plastic injection-molded binary optical element preferably produced by the two disclosed techniques.

Briefly, the first technique utilizes a castable surface coat (e.g., ceramic, sol-gel, or epoxy resin) which is placed over a master diffractive optical element or microstructure (made by any means such as holographically, ion-milled, diamond-turned, reactively ion-etched, etc.), after which it is backed with a hardened material (e.g., a metal-filled ceramic or resin casting system). The cast surface coat is then cured or solidified after which a hard, strong, rigid mold or mold insert is produced both in the shape of the part to be molded and including a replica of the hologram, kinoform, binary optical element, or other microstructure, as a single integral part.

The second technique utilizes mechanical means such as ion-milling, reactive ion-etching, Electrical Discharge Machine (EDM), etc., to mechanically machine the microstructure directly into a mold base or a mold insert. Both techniques result in a mold or cast tool which will accurately reproduce the intended microstructure. Both techniques provide a more cost-effective means and require less time to fabricate a mold than previous methods, and they more accurately replicate the microstructure. Both disclosed techniques result in an extremely hard, strong, and rigid tool. The first technique is intended to be used for smaller production volumes or where inserts may be changed periodically, e.g., every six months. The second technique is intended for high production volumes where minimal wear over time is desired, or where the down time of changing inserts cannot be tolerated.

1. The First Technique

In the first technique, a master grating, hologram, diffractive optical element, or other microstructure must first be provided. This may be accomplished using holographic techniques, etching, and/or reactive ion-etching, ion-milling, diamond-turning, or other microstructure fabrication techniques. The master microstructure may be fabricated on many different substrates such as photoresist, glass, ceramic, etc.

One method of providing a holographic glass master grating will be described as follows. A glass substrate is first washed and then coated with a photosensitive material such as a photoresist. The substrate is then exposed by a two-beam interference method or an electron beam drawing method and the photoresist is developed to form a surface relief resist pattern on the surface of the substrate.

Figure 2:
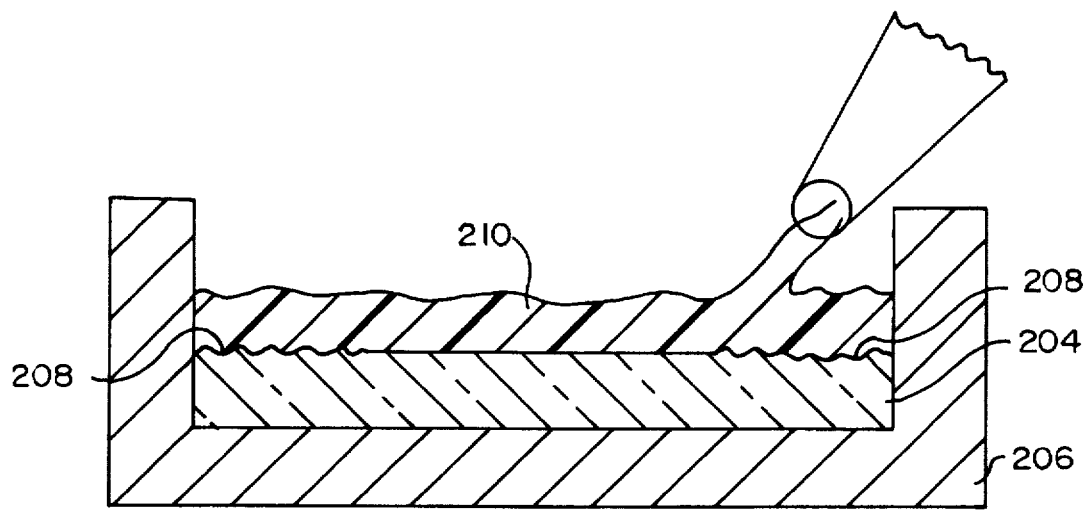
FIG. 2 is a cross-section and schematic representation of the step of casting a liquid surface coating over the master containing a holographic microstructure.

In FIG. 2, the holographic glass master grating 204 is firmly affixed to a framed metal base plate 206 using wax, clay, or an adhesive, with the holographic microstructure 208 facing up. The framed base plate 206 may be either flat or have a complex shape depending on the shape of the final intended molded part and the configuration of the desired insert. Elements may be added to the mold base 206 and master holographic microstructure 208 to provide for a runner system, gates, cooling lines, breathers, ejector pins, or any other functional or nonfunctional injection molding tooling characteristic known to those of skill in the field.

The next step is to provide a high temperature, high resolution liquid surface coating which has the ability to replicate the smallest features of the microstructure, and which will ultimately be cured or solidified and used as the molding tool. Preferably, a ceramic, sol-gel, or epoxy system is used for the liquid surface coating. However, alternate materials may be used such as metal-filled epoxies, metal-matrix composites, engineering ceramics, intermetallics (such as gamma prime nickel aluminide, $Ni_3Al$), etc. Those of skill in this field will readily perceive that a wide variety of materials may be used such as to provide a hard-curing or solidifying material capable of use as a molding tool.

After thoroughly mixing the components of the liquid surface coating, the mixture may be placed into a vacuum chamber and a vacuum pulled to remove any air from the liquid. This will prevent any air bubbles from showing up in the molding tool.

In FIG. 2, the liquid surface coating 210 is then carefully poured or cast onto the master grating 204. Alternatively, the liquid surface coating 210 may be sprayed or brushed on the master grating 204. A sufficient amount is used to cover the grating but not excessively so as to adversely affect replication during the curing or solidifying process. For example, with high temperature epoxy-based systems, the depth should not exceed 2 mm. Care is taken not to introduce air bubbles during the pouring stage.

Figure 3:
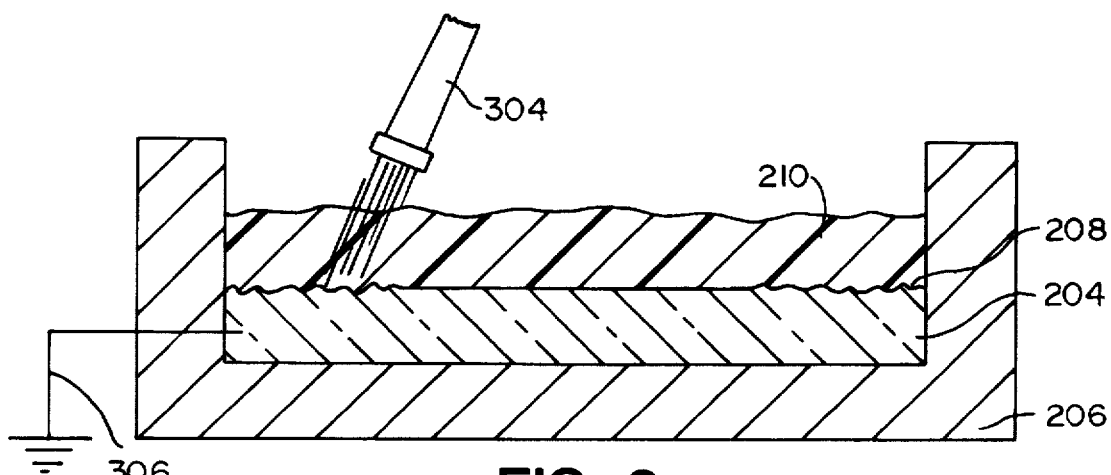
FIG. 3 is a cross-section and schematic representation of the step of releasing surface tension (with an artists brush) in the liquid surface coating.

Preferably, the next step is to reduce the surface tension of the liquid surface coating 210 so that the liquid surface coating penetrates the surface irregularities of the master microstructure 208. In FIG. 3, a fine hair artists brush 304 is used to gently "push" the liquid surface coating 210 into the surface irregularities of the master microstructure 208. Other and/or complementary techniques for releasing the surface tension include: grounding the master grating 204 through a ground wire 306 to discharge any charges from the master grating 204 which would prevent the liquid surface coating 210 from penetrating the master microstructure 208; charging or discharging the liquid surface coating 210; washing the surface of the master microstructure 208 with de-ionized water; spraying the liquid surface coating 210 onto the master grating 204 from a variety of orientation angles so that all surfaces of the master microstructure 208 are covered; pressurizing the liquid to force it to penetrate into the microstructure; and/or vibrating the base plate 206 to encourage penetration of the microstructure by the liquid surface coating. Again, persons of skill in this field may readily perceive a variety of ways of reducing the surface tension to permit the liquid surface coating to fully penetrate the microstructure.

If necessary, more layers of the liquid surface coating may be applied as described above. For example, where the surface irregularities of the master microstructure 208 have a vertical range greater than 2 microns, multiple applications of the liquid surface coating may be required.

Preferably, a molding tool backing layer is then applied on top of the liquid surface coating 210 to enhance its strength. The tool backing layer material is prepared using the appropriate chemistry (e.g., ceramic, metal-filled epoxy, etc.). After thoroughly mixing the components of the tool backing layer, the mixture is placed into a vacuum chamber and a vacuum is again pulled to remove any air. The vacuum is then released and the mixture allowed to return to steady state. The vacuum may again be pulled, held, and released. This cycle may be repeated two or more times or until no visible air bubbles are observed. This also will prevent any air bubbles from showing up in the tool.

The tool backing layer mixture is then slowly poured on top of the liquid surface coating 210 in one or more applications. A sufficient amount of the tool backing layer is used to build up the molding tool to a thickness appropriate for insertion into a master unit die, a steel chase, or other similar injection mold base (typically 20 mm to 75 mm, but could be as much as 200 mm or greater). Care is taken not to introduce air bubbles. The molding base plate is then placed into a pressure vessel and allowed to cure undisturbed. The length of this curing process is dependent on the materials used and the overall thickness of the molding tool.

After the molding tool has cured at room temperature, it may be necessary to harden and/or strengthen the tool prior to use. The typical technique consists of heat-treating the tool, but other techniques such as ageing, exposure to a gaseous environment (inert or reactive), ion implantation, and/or combinations of various temperature, pressure, and gaseous environments may be used.

Figure 4:
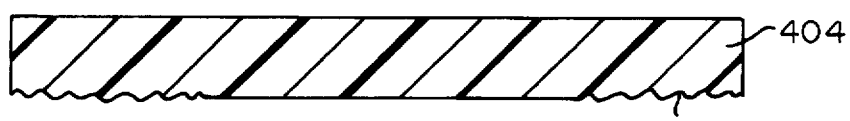
FIG. 4 is a cross-section of the molding tool containing the holographic microstructure.

After the molding tool has cured and any hardening has been performed thereon, the tool is removed from the base plate 206. FIG. 4 depicts the cured molding tool 404. It can be seen that the molding tool microstructure 408 replicates the master microstructure 208 in all details. At this point, the molding tool 404 is placed into the master unit die, steel chase, or standard mold base. For insertion into a pre-existing mold base, it is preferred (but not necessary) that the insert be produced with the hardened liquid surface coating applied to the walls of the insert as well as to the surface containing the microstructure. If the tool is placed into a steel chase, it may be necessary to use a filler between the steel chase and the tool insert to fill any gaps. Alternatively, EDM or Computer Numerical Control (CNC) machining techniques may be used to cut molding tool 404 to an appropriate shape for insertion into the molding machine.

Figure 5:
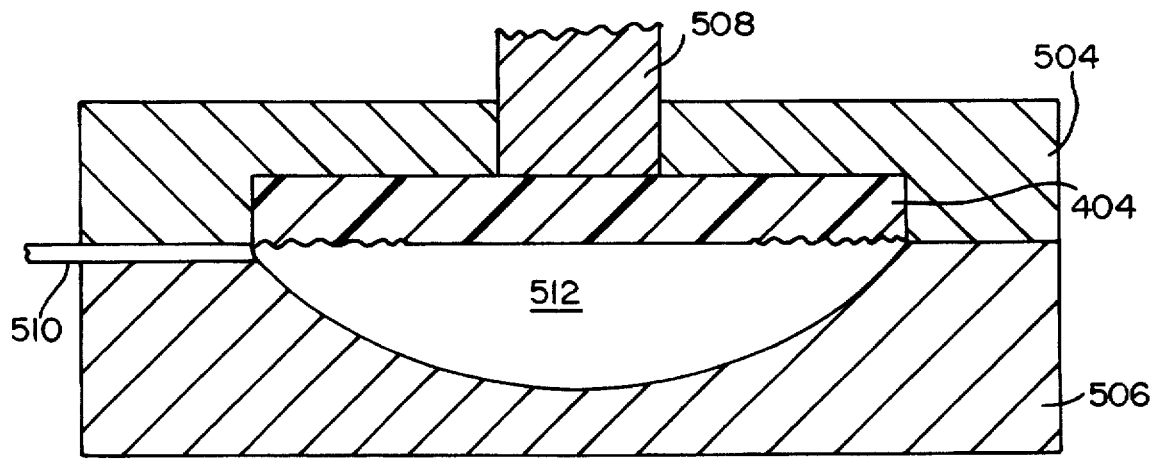
FIG. 5 is a cross-section of the molding tool inserted in a plastic injection-molding machine.

FIG. 5 depicts the molding tool 404 inserted into an injection molding machine comprising cover plate 504, mold base 506, ejection pin 508, and the runner/gate/breather port 510. The mold cavity 512 is in the shape of the desired final product. The molding tool 404 may be placed in either the cover plate 504 or the mold base 506.

Figure 6:
FIG. 6 is a cross-section of an injection-molded plastic BOE having the holographic microstructure embedded therein.

Standard molding conditions and materials may then be used to mass produce a plurality of plastic elements having the desired microstructure embedded therein. For example, an optically clear polycarbonate liquid plastic may be injected through the port 510 into the cavity 512 and allowed to harden therein. The cured plastic element 610 (FIG. 6) may be either manually removed or dynamically ejected using one or more ejection pins. A compression molding process may be used wherein the injected molten plastic is dynamically compressed by the molding tool, or portions of the tool, to impart a feature into the molded part.

An improved method for injection molding according to the present invention and which will allow for the accurate replication of small features (such as holographic microstructure) into the injection molded part includes the use of an oversized ejection pin containing the microstructure therein. For example, in FIG. 5, the molding tool 404 may be integral with the ejector pin 508. In fact, the ejector pin 508 may be molded with the molding tool 404 using the technique discussed above. Where the ejector pin 508 can maintain contact with the molded part from the time of injection until the time of ejection, it can be seen that more accurate replication of microstructure will result. Furthermore, the ejection pin 508 can be used in a compression or pseudo-compression mode whereby, after the molten plastic is injected into the cavity and during the cool-down curing period, the ejector pin 508 may be slowly pressed into the cavity (like a compression mold) with the pressure increasing continuously until the part is finally ejected.

While injection molding has been described above, it will be readily perceived that the above-described features of the present invention may be applicable to a process for casting plastic elements containing the microstructures.

EXAMPLE 1

A specific example applying the first technique according to the present invention will now be described.

A holographically produced test grating of one micron period with approximately one micron depth was recorded in Shipley 1811 photoresist on a microscope slide glass substrate. This master was then firmly affixed to a framed base plate (plastic box) using double-side adhesive tape, with the developed photoresist surface facing up. Wax was placed around the microscope slide to make the diffractive surface flush with the surface of the desired tool.

A liquid surface coating was prepared at room temperature (65°–75° F.), ambient pressure, and 50% humidity, using a ratio of 100 parts of a graphite-filled resin to 8 parts of hardener.

The epoxy resin consisted of a mixture of phenol polymer with formaldehyde glycidyl ether, diglycidyloxybutane, aluminum hydroxide, carbon black and aluminum. The hardener consisted of a mixture of M-xylene diamine reaction products, isophorone diamine, amine adduct, benzene diamine diethyl toluene diamine, and ethyl methyl imadazol. A commercial resin and hardener used for this example was Ciba Geigy (Ren Plastics Division) Part No. TDT 209–3.

After thoroughly mixing the resin and hardener, the mixture was placed into a vacuum chamber and a vacuum equivalent to 30 inches of Hg was pulled for 1–2 minutes. The vacuum was then released and the mixture allowed to return to steady state. The vacuum was again pulled, held for 1–2 minutes and released. This cycle was repeated 2–3 times until no visible air bubbles were observed.

This mixture was then carefully applied to the molding base plate using a fine bristled hair artists' brush. A sufficient amount of the mixture was used to cover the test grating to a depth of approximately 2 mm. Care was taken not to introduce air bubbles. Using the fine hair artists' brush, the mixture was gently "pushed" into the surface irregularities of the test grating to reduce the surface tension so that any trapped gas, liquid, or particles were removed from the interface. The molding base plate was then placed into a pressure vessel and allowed to cure undisturbed at ambient temperature (65°–75° F.), 90 psi pressure, using dry nitrogen and 0% humidity for one hour, until the surface was "tacky" to the touch.

Two more layers of the surface coating were prepared and applied as described above, to bring the total surface coat thickness to approximately 6 mm.

A tool backing layer material was then prepared using 100 parts of graphite-filled resin to 8 parts of hardener and 50 parts of aluminum shot. The backing material comprised the TDT 209-3 material plus aluminum shot/powder up to one quarter inch in diameter. Preferably, the smaller diameter aluminum powder is applied to the lower backing layers with the larger-sized shot being used in the upper layers.

After thoroughly mixing the backing layer components, the mixture was placed into a vacuum chamber and a vacuum equivalent to 30 inches of Hg was pulled for 1–2 minutes. The vacuum was then released and the mixture allowed to return to steady state. The vacuum was again pulled, held for 1 minute, and then released. This cycle was repeated 2 times until no visible air bubbles were observed. This mixture was then slowly poured into the molding base plate. A sufficient amount was used to build up the molding base plate (molding tool) to a thickness appropriate for insertion into a master unit die (45 mm). Care was taken not to introduce air bubbles. The molding base plate was then placed into a pressure vessel and allowed to cure undisturbed at ambient temperature, 90 psi, using dry nitrogen, and 0% humidity for 12 hours (or longer depending on the thickness desired).

After the molding tool had cured at room temperature, it was necessary to heat treat the tool to cause cross-linking of the material to take place. Starting at standard temperature and pressure, the tool temperature was slowly raised at a rate of 25° F. per hour in an autoclave. This slow rate was used to prevent any potentially damaging thermal gradients. Once the tool had reached a temperature of 350° F., it was held there for approximately 2–3 hours depending upon tool size. The temperature was then slowly reduced until ambient temperature was achieved.

At this point, the tool was ready to be placed into a master unit die. For insertion, it was necessary that the filled resin insert have a hardened surface coat applied to the walls of the insert as well as the surface containing the microstructure. This enhanced stability of the molding tool within the master unit die.

A plurality of polycarbonate plastic elements were then produced using standard injection molding conditions and materials. However, longer cycle times were used to allow for adequate heat dissipation from the insert. Fans were used to assist cooling of both halves of the injection molding machine. The produced plastic elements accurately replicated all of the surface irregularities of the molding tool.

2. The Second Technique

The second technique of molding a microstructure into a plastic element according to the present invention will now be described. In the second technique, no master grating is fabricated. Masks are created using conventional techniques such as those used in the microelectronics industry. An etching (such as electron beams etching) or ion-milling machine may be used to machine the microstructure through the masks directly into an injection mold base or insert without machining through a transfer interlayer such as a photoresist layer. Once the microstructure has been defined, a series of masks can be designed and fabricated from which the machined application of the sum of the masks represents the converse of the desired microstructure profile. Using hardened tool steel (e.g., S7, H13, etc.), aircraft aluminum, nickel, gamma prime nickel aluminide, or nickel plated aluminum or steel, a substrate suitable for micro-machining is polished or diamond-turned to a optical wavefront quality of ¼ of the smallest microstructure feature size or better and minimal surface roughness. The quality of the final part is directly related to the quality of the substrate at this point. It is typically better to achieve a surface finish of 1/20 of the smallest microstructure feature size.

The thus-machined substrate may be either a mold insert or the mold base itself. The machined substrate may be either curved or flat depending upon the characteristics of the final part. The machined substrate may have any additional features needed for injection molding such as gates, runners, ejectors, attachment mechanisms, cooling lines, etc. These features are preferably present in the substrate prior to creating the microstructure in the surface, but may be added later if the microstructure is sufficiently protected during the machining process. By using etching techniques, or reactive ion-etching techniques, or ion-milling techniques, coupled with the successive application of the masks, or diamond-turning techniques, the converse of the desired microstructure can be created in the substrate.

At this point, the substrate may be hardened, if warranted, using heat-treating, exposure to a gaseous environment (inert or reactive), ion implantation, and/or combinations of various temperature, pressure, and gaseous environments, etc.

The machined substrate is then inserted into the mold base (if not integral therewith) and combined with the other mold half to complete the injection molding machine and provide for the two halves of the molded part. Diffractive grating or microstructures may be present in either or both the cavity half and the ejector halves of the tool.

As with the first technique, standard injection molding conditions and materials may be used when injection molding the plastic parts according to the second technique.

EXAMPLE 2

A specific example applying the second technique according to the present invention in an ion-milling embodiment will now be described.

The first step was the generation of an optical prescription, and this was done using CODEV (a commercially available optical design code from Optical Research Associates). A theoretical optical prescription was derived for a ½ inch sensor array. The optical prescription had the following characteristics:

Field Of View—10 Degrees

Number of elements—2

Entrance pupil diameter—18.5 mm

Back focal length—19.8 mm

Material—Acrylic

The goal for this design was to obtain a result using only one material that would be both chromatically corrected and thermally compensated with optical performance superior to that of the detector. Using the Holographic Optical Element (HOE) option within CODEV, it was possible to define a diffractive surface as part of the optical system. Using the optimization capability of CODEV, a prescription was derived that utilized two diffractive surfaces, one on each plano surface of the two plano-convex lenses.

The next step was to convert the HOE design coefficients defined in CODEV into what is commonly called a sag table. The sag table defines the amount of optical path difference the HOE surfaces impart to the wavefront across the respective apertures. From these sag tables, the physical shapes of the BOE surfaces were computed. The only difference between the HOE surface and the BOE surface is that the BOE surface will be a step-wise approximation of the smooth, continuous HOE surface.

Once the BOE surfaces were defined, it was necessary to convert the information into a series of masks. The sum of these masks, when ion-milled, would generate a negative of the desired BOE surface. The BOE surface was broken down into a group of so-called primitives. These primitives then became the patterns described on each mask. The number of masks used depends on the complexity of the BOE surface, the feature sizes, and the replication accuracy of the BOE surface to the original HOE surface. For the present example, three masks were necessary, resulting in a BOE structure having eight levels. The artwork for the masks was generated using conventional lithographic techniques, and the masks themselves were generated using conventional chrome masking techniques used in the electronics industry.

Figure 7:
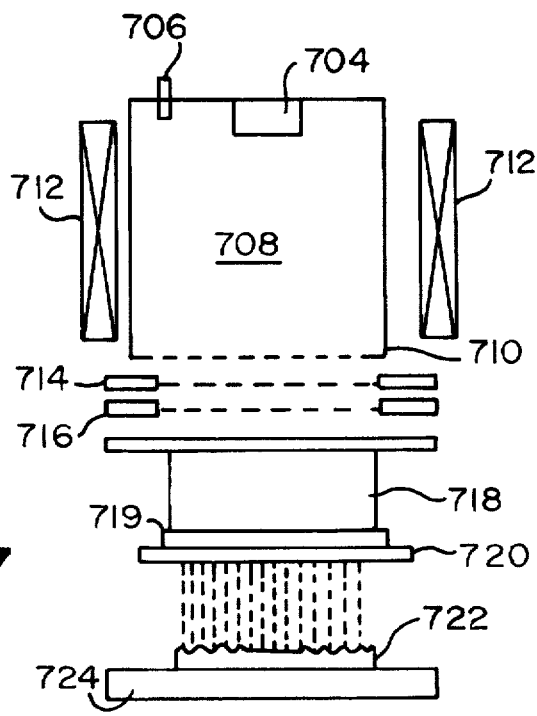
FIG. 7 is a schematic diagram of an ion-milling machine.

In FIG. 7, a schematic representation of the ion-milling machine used in this example is shown. A magnetically-confined gas discharge is obtained between a thermionic cathode 704 and a concentric-anode cylinder 706. The plasma 708 is completely confined to the discharge chamber 710 using magnets 712. To extract the ion beam from the discharge region, a potential difference is applied between an electron suppressor grid 714 and an extraction grid 716 with aligned holes. The thus-collimated ion beam 718 is modulated by the above-described mask 719, and controlled by shutter 720 so that it mills the appropriate microstructure into metal substrate 722 mounted on stage 724.

The ion-milling of the present example was performed on a Technics ion-milling machine using three different substrate materials. The polished substrates were three inches in diameter, and the different substrate materials used were aluminum, solid nickel, and nickel-plated steel. A fourth material (gamma prime nickel aluminide) is currently being investigated. The polished substrates were then inserted into the ejector half of an injection mold base. The cover half contained the sprue, runners, gates, and polished inserts for the other half of the lenses. The tooling was customized to allow for centration alignment of the two halves of the lens, as well as to assure accurate reproducibility during closure of the mold. The mold was mounted on a 66 ton Sandretto injection molding machine. Rohm & Haas Kamax V920 W Optical Grade Acrylic was used with standard injection molding temperatures and pressures (those recommended by the manufacturer). After minor adjustments to alignment and process control, the injection-molded plastic elements accurately replicated all of the surface discontinuities of the HOE.

EXAMPLE 3

Another way of machining the molding tool according to the second technique involves the use of Electrical Discharge Machining (EDM). An example of producing a molding tool according to the EDM embodiment of the second technique will now be described.

Conventional plunging EDM techniques involve the fabrication of one or more electrodes in the shape of the surface of the intended part and having the surface discontinuities thereof. The electrodes typically are carbon or copper, but other conductive materials may be used. The EDM process itself involves the discharge of a large electrical field between the electrode and the tool to be machined. This discharge results in the ablation of the tool material. It also results in the deterioration of the electrode during the burning process. For this reason, it is typically necessary to fabricate several electrodes which are successively applied to increase the accurate replication of the intended surface.

A sample tool was constructed where concentric diffractive structures varying in size from a fraction of a micron to tens of microns were produced in two copper electrodes using conventional diamond-turning methods. The diffractive structures were replicas of each other. Using a Charmilles plunging EDM machine, the diffractive structure was "burned" into a hardened steel molding tool using repetitive application of the two copper electrodes with surprisingly successful results. The reproduced diffractive structures were sufficiently accurate to enable BOE's to be produced with such a molding tool. The repeatability and/or reproducibility of the EDM machine used was 1.27 microns, sufficient for some microstructures, but improvable with modifications to the EDM machine such as an air bearing in the movement translation stages.

3. All-Plastic Binary Optical Element

Figure 1A:
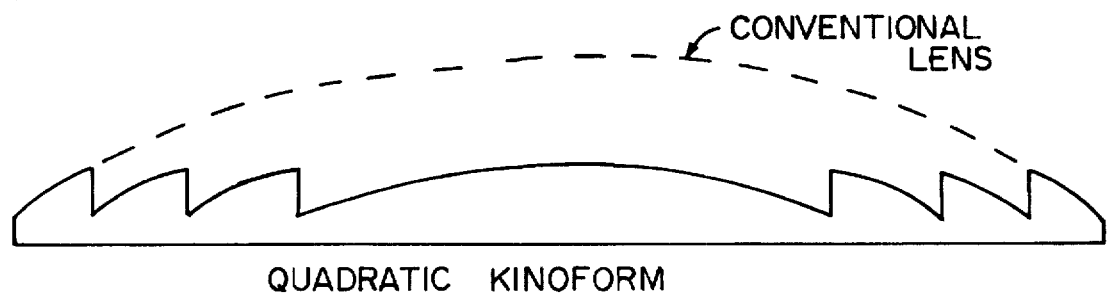
FIGS. 1A, 1B, and 1C are schematic representations illustrating a quadratic kinoform, a linear kinoform, and a binary kinoform (binary optics), respectively.
Figure 1B:
Figure 1C:
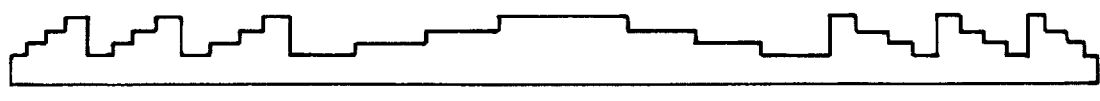

The present invention also pertains to a particular plastic element, i.e., a molded plastic binary optical element (BOE) preferably produced by the techniques described above. FIG. 1C shows a schematic representation of a BOE produced by the above-described first technique of the present invention. One of skill in this field can readily understand that by varying the location, size, and pattern of the microstructure on the plastic lens element, a BOE can be produced which comprises a single plastic or moldable material that is able to optically function in a manner which normally requires multiple materials with different refractive indices. Such a plastic BOE lens system can be thermally and/or chromatically corrected, as well as provide an optimized balance of other optical aberrations. The concept thus combines three technologies: binary optics; conventional optical design; and the process of reproducing binary optical elements in plastic or moldable materials.

Chromatic and thermal correction may be accomplished by appropriately designing the height, width, and pattern of the binary surface irregularities. For example, as the wavelength of the incident light changes, the refractive index of the BOE material will also change. However, the diffractive structure can be designed to cancel out this effect so that changes in the wavelength in the incident light do not produce a change in the color of the light emerging from the BOE. Likewise, as the temperature of the BOE changes, the refractive index of the BOE material will also change. Again, the diffractive structure of the BOE may be designed to cancel out the change in refractive index which occurs with temperature change. As used in the specification the term "diffraction" includes the phase shifting of the incident light wavefront.

Thus, BOE's produced according to the techniques described above may be used to create new configurations of lens systems using all plastic material and binary surfaces. Ideally, a single material could be used with the binary structure providing thermal compensation and chromatic correction as well as compensation and balancing of all other optical aberrations. For example, imaging lenses and multiple-beam grating structures like fan-out gratings may be produced by the techniques described above. Multiple BOE systems may replace heavy lens systems requiring many glass lenses and other optical structures. Such all-plastic BOE's are envisioned as being used in areas of imaging, telecommunications, medical, energy-delivery, or other applications where optical multiplexing, manipulation, and sensing are desired. Beam steering, lightwave modulation, optical interconnections, collimating, and redistributing light waves are other functions for the all-plastic BOE's according to the present invention.

CONCLUSION

Thus, what has been described is a method of molding a microstructure into a plastic element where the molding tool is inexpensively and quickly produced, yet has sufficient rigidity to withstand the temperatures and pressures of the molding process. Also described is a binary optical element produced by the techniques according to the present invention.

While the present invention has been described with what are presently considered to be the preferred embodiments, the invention is not limited thereto. Specifically, the teachings of the present invention may be broadly applied within the spirit and scope of the appended claims. For example, while the preferred embodiments involve injection molding, other plastic-molding and tooling techniques may be used such as casting, embossing, stamping, stereolithography and other rapid prototyping techniques, plasma coating, sputtering, chemical or physical vapor deposition, solid-state diffusion, ion implantation, corona discharge implantation, spraying, permanent mold casting, centrifugal casting, arc plasma spray casting (in a vacuum or inert gas), etc. Likewise, other materials may be used for the molding tool so long as such materials (when cured) have sufficient rigidity to be utilized in the appropriate molding technique. Also, while the first technique of producing a molding tool described above utilizes the pouring or casting of the liquid surface coating onto the master microstructure, spraying, brushing, and other techniques may be used. Further, the microstructure described above pertains to an optical microstructure. However, other functional plastic microstructures (such as microgears, shafts, etc.) may be produced by the techniques described above. All such alternative techniques and structures are within the spirit of the attached claims.

What is claimed is:

1. A method of molding a plastic element having a microstructure embedded therein, comprising the steps of:

defining a microstructure for performing a predetermined function;

converting the defined microstructure into at least one pattern corresponding to a negative of the defined microstructure;

machining directly into a molding base element a negative microstructure corresponding to said pattern without machining material other than the molding base element;

placing the machined base element into a molding machine;

introducing a plastic element into the molding machine;

transferring the negative microstructure from the molding base element into a positive microstructure in the plastic element; and removing the molded plastic element having the positive microstructure from the molding machine.

2. A method according to claim 1 wherein said machining step comprises the step of ion-milling a molding base element.

3. A method according to claim 1 wherein said machining step comprises the step of reactive ion etching the molding base element.

4. A method according to claim 1 wherein said machining step comprises the step of machining the molding base element using a numerical control milling machine to machine the molding base element.

5. A method according to claim 1 wherein said machining step comprises the step of machining the molding base element a plurality of times.

6. A method according to claim 1 wherein the molding base element is selected from a group consisting of hardened tool steel, aircraft aluminum, nickel, nickel plated aluminum, nickel plated steel, epoxy, metal matrix composites, metal filled epoxies, engineering polymers, ceramics, nickel alumanide, and gamma prime nickel alumanide.

7. A method according to claim 1 wherein said machining step comprises the step of electrical discharge machining a conductive molding base element.

8. A method according to claim 7 further comprising the step of forming a microstructure on a conductive electrode using one or more of the following methods: diamond-machining, ion milling, reactive-ion etching, lithographic techniques.

9. A method of forming a molding tool having a negative microstructure embedded therein, the molding tool for use in molding a plastic element having a positive microstructure corresponding to the negative microstructure, comprising the steps of:

defining a positive microstructure for performing a predetermined function;

converting the defined positive microstructure into at least one pattern corresponding to a negative of the defined positive microstructure; and machining directly into a molding base element a negative microstructure corresponding to said pattern without machining material other than the molding base element.

10. A method according to claim 9 wherein said converting step comprises the step of producing at least one mask which defines said microstructure.

11. A method according to claim 10 wherein said machining step comprises the step of ion-milling the molding base element.

12. A method according to claim 10 wherein said machining step comprises the step of reactive ion-etching the molding base element.

13. A method according to claim 9 wherein said converting step comprises the step of producing at least one conductive electrode having said microstructure embedded therein.

14. A method according to claim 13, wherein said machining step includes the step of electrical discharge machining a conductive molding base element.

15. A method according to claim 1, wherein the step of transferring the microstructure includes the step of transferring the microstructure from the molding base element to the plastic element to cause the plastic element to correct chromatic and/or thermal aberrations in light passing through said element.

16. A method according to claim 1, wherein said step of transferring the microstructure includes the step of transferring the microstructure from the molding base element to the plastic element to cause the plastic element to refract and diffract light passing therethrough.

17. A method according to claim 1, wherein said step of transferring the microstructure includes the step of transferring a fanout grating structure.

18. A method according to claim 1, wherein the step of transferring the microstructure includes the step of transferring a microstructure to the plastic element which causes a light beam incident on the plastic element to be split into a plurality of light beams.

19. A method according to claim 1, wherein the step of transferring the microstructure includes the step of transferring a binary microstructure.

20. A method according to claim 1, wherein the step of transferring the microstructure includes the step of transferring analog surfaces to the plastic element.

21. A method according to claim 1, wherein the step of transferring the microstructure includes the step of transferring a grating structure.

22. A method according to claim 1, wherein the step of transferring the microstructure includes the step of transferring a blazed diffraction grating.

23. A method according to claim 1, wherein the step of machining includes the step of diamond turning the molding base element.

24. A method according to claim 1, wherein said machining step comprises the step of machining into a metal molding base element the predetermined microstructure.

25. A method according to claim 1, wherein said machining step comprises the step of ion etching the molding base element.

26. A method according to claim 1, wherein said machining step comprises the step of electron beam etching the molding base element.

27. A method of molding a plastic element having a microstructure embedded therein, comprising the steps of:

defining a microstructure for performing a predetermined function;

converting the defined microstructure into at least one pattern corresponding to a negative of the defined microstructure;

machining directly into a molding base element a negative microstructure corresponding to said pattern without machining material other than the molding base element;

placing the machine base element into a molding machine;

introducing a plastic element into the molding machine;

transferring the negative microstructure from the molding base element into a positive microstructure in the plastic element, the plastic element with microstructure refracting and diffracting light beams passing therethrough; and removing the molded plastic element having the positive microstructure from the molding machine.

28. A method of molding a plastic element having a microstructure, comprising the steps of:

defining a microstructure for performing a predetermined function; converting the defined microstructure into at least one pattern corresponding to a negative of the defined microstructure;

machining directly into a molding base element a negative microstructure corresponding to said pattern without machining material other than the molding base element;

placing the machined base element into a molding machine;

introducing a plastic element into the molding machine;

transferring the negative microstructure from the molding base element into a positive microstructure in the plastic element, the plastic element and microstructure correcting thermal and/or chromatic aberrations in light passing therethrough;

removing the molded plastic element having the positive microstructure from the molding machine.

29. A method of molding a plastic element having a microstructure embedded therein, comprising the steps of:

defining a microstructure for performing a predetermined function;

creating at least one primitive from the defined microstructure, the primitive corresponding to a negative of the defined microstructure;

converting the at least one primitive into at least one mask, said mask having at least one opening therein;

machining the predetermined microstructure into a molding base element directly through the openings in the mask without machining material other than the molding base element;

placing the machined base element into a molding machine;

introducing a plastic element into the molding machine;

transferring the microstructure from the molding base element to the plastic element; and removing the molded plastic element from the molding machine.

30. A method according to claim 9, wherein said machining step comprises the step of machining the molding base element using a numerical control milling machine to machine the molding base element.

31. A method according to claim 9, wherein the step of machining includes the step of diamond turning the molding base element.

* * * * *